(12) United States Patent
Jang

(10) Patent No.: US 12,493,115 B2
(45) Date of Patent: Dec. 9, 2025

(54) RADAR CONTROL DEVICE AND METHOD

(71) Applicant: HL KLEMOVE CORP., Incheon (KR)

(72) Inventor: Sang Hee Jang, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 305 days.

(21) Appl. No.: 18/199,365

(22) Filed: May 19, 2023

(65) Prior Publication Data
US 2024/0125914 A1  Apr. 18, 2024

(30) Foreign Application Priority Data
Oct. 17, 2022 (KR) .................. 10-2022-0133523

(51) Int. Cl.
*G01S 13/72* (2006.01)
*G01S 13/931* (2020.01)

(52) U.S. Cl.
CPC .......... *G01S 13/723* (2013.01); *G01S 13/931* (2013.01)

(58) Field of Classification Search
None
See application file for complete search history.

(56) References Cited

U.S. PATENT DOCUMENTS

| | | | |
|---|---|---|---|
| 9,983,301 B2* | 5/2018 | Liu | G01S 13/931 |
| 2019/0004166 A1* | 1/2019 | Orlowski | G01S 13/726 |
| 2019/0277960 A1* | 9/2019 | Schiffmann | G01S 13/723 |
| 2020/0349718 A1* | 11/2020 | Dang | G01S 13/931 |

FOREIGN PATENT DOCUMENTS

| | | |
|---|---|---|
| KR | 10-2020-0000164 | 1/2020 |
| KR | 10-2022-0027405 | 3/2022 |
| KR | 10-2022-0125491 | 9/2022 |

OTHER PUBLICATIONS

Office Action dated May 29, 2024 for Korean Patent Application No. 10-2022-0133523 and its English translation provided by Applicant's foreign counsel.

* cited by examiner

*Primary Examiner* — Bernarr E Gregory
(74) *Attorney, Agent, or Firm* — WOMBLE BOND DICKINSON (US) LLP

(57) ABSTRACT

A radar control device may comprise a transceiver configured to transmit a transmission signal for detecting surroundings of a host vehicle and receive a reception signal reflected back to the transceiver, a track generator configured to generate a track for an object detected based on the reception signal, a vehicle position calculator configured to calculate a position of the host vehicle at every preset period, and an orientation angle estimator configured to estimate an orientation angle of the track based on the track for the detected object and the position of the host vehicle.

20 Claims, 9 Drawing Sheets

RADAR CONTROL DEVICE AND METHOD

CROSS-REFERENCE TO RELATED APPLICATION

This application claims priority from Republic of Korea Patent Application No. 10-2022-0133523, filed on Oct. 17, 2022, which is hereby incorporated by reference for all purposes as if fully set forth herein.

BACKGROUND

Technical Field

Embodiments of the present disclosure generally relate to a radar control device and method.

Description of Related Art

Recently, vehicles equipped with radar are increasing. An electronic control unit (ECU) of the vehicle may calculate a distance, relative velocity and angle between a host vehicle and an object around the host vehicle based on information output from the radar installed in the vehicle.

As such, a radar-equipped vehicle may provide various safety and convenience functions using the distance, relative velocity, and angle between the host vehicle and the object around the host vehicle.

For example, collision avoidance, smart cruse, or auto-parking may be performed by obtaining the distance, angle, or relative velocity between the host vehicle and the object around the host vehicle using the information input from the radar equipped in the vehicle.

To that end, it may be important to precisely determine the movement of detected other vehicles, and if the initial orientation angle is precisely calculated, the reliability of the above-described convenience functions may be increased.

BRIEF SUMMARY

Various embodiments of the disclosure may provide a radar control device and method for continuously compensating for the position of a host vehicle and estimating the orientation angle of a track for an object by considering the compensated position of the host vehicle.

To achieve the foregoing objectives, in an aspect, the disclosure provides a radar control device comprising a transceiver transmitting a transmission signal for detecting surroundings of a host vehicle and receiving a reflected reception signal, a track generator generating a track for an object detected based on the reception signal, a vehicle position calculator calculating a position of the host vehicle every preset period, and an orientation angle estimator estimating an orientation angle of the track based on the track and the position of the host vehicle.

In another aspect, the disclosure provides a radar control method comprising a radar transmission/reception step transmitting a transmission signal for detecting surroundings of a host vehicle and receiving a reflected reception signal, a track generation step generating a track for an object detected based on the reception signal, a vehicle position calculation step calculating a position of the host vehicle every preset period, and an orientation angle estimation step estimating an orientation angle of the track based on the track and the position of the host vehicle.

According to the disclosure, the radar control device and method may estimate the orientation angle of a track for a detected object and estimate an object detected from far away, by compensating for the position of the host vehicle.

DESCRIPTION OF DRAWINGS

The above and other objects, features, and advantages of the disclosure will be more clearly understood from the following detailed description, taken in conjunction with the accompanying drawings, in which:]

DETAILED DESCRIPTION

Figure 1:
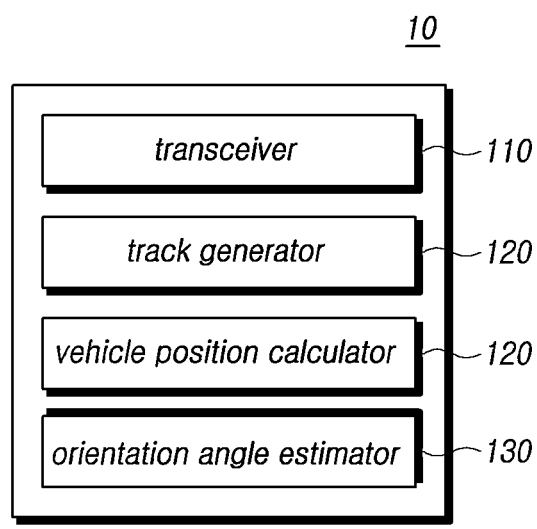
FIG. 1 is a block diagram for illustrating a radar control device according to an embodiment of the present disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a block diagram for illustrating a radar control device 10 according to an embodiment of the present disclosure.

Referring to FIG. 1, the radar control device 10 according to an embodiment of the present disclosure may include a transceiver 110, a track generator 120, a vehicle position calculator 130, and an orientation angle estimator 140.

The radar control device 10 may be configured to receive a reception signal which is a result of detecting the surroundings of the host vehicle 20 from a radar, generate a track 410 for an object detected based on the reception signal, calculate the position of the host vehicle 20 at every preset period, and estimate the orientation angle of the track 410 for the detected object based on the position of the host vehicle 20 and the track 410 for the detected object.

According to an embodiment of the present disclosure, the radar control device 10 may be part of an advance driver assistance system (ADAS) that provides information for driving the host vehicle 20 or assists a driver in controlling the host vehicle 20, although not required.

Here, the ADAS may refer to various types of advanced driver assistance systems, and may include, for example, but not limited to, autonomous emergency braking, smart parking assistance system (SPAS), blind spot detection (BSD), adaptive cruise control (ACC), lane departure warning system (LDWS), lane keeping assist system (LKAS), and lane change assist system (LCAS). However, the present disclosure is not limited thereto.

The radar control device 10 according to the present disclosure may be equipped in a manual (or non-autonomous) vehicle, which requires a driver to operate it manually, or an autonomous vehicle.

The transceiver 110 may transmit a transmission signal for detecting surroundings of the host vehicle 20 and receive a reception signal reflected back to the transceiver 110.

In an example, the transceiver 110 may comprise a radar sensor including an antenna unit, a radar transmitter, and a radar receiver.

The antenna unit of the radar sensor may include one or more transmission antennas and one or more reception antennas. The transmission and/or reception antenna may be an array antenna including one or more radiation elements connected through feeding lines, but is not limited thereto.

The antenna unit may include a plurality of transmission antennas and a plurality of reception antennas, and may have various array structures depending on the arrayed order and arrayed interval.

The radar transmitter of the radar sensor may switch to, or select, one of the plurality of transmission antennas included in the antenna unit to transmit transmission signals through the switched or selected transmission antenna, or may transmit transmission signals through multiple transmission channels allocated to the plurality of transmission antennas.

The radar transmitter of the radar sensor may include an oscillation unit configured to generate transmission signals for one transmission channel allocated to the switched or selected transmission antenna or multiple transmission channels allocated to the plurality of transmission antennas. The oscillator may include, for instance, a voltage-controlled oscillator (VCO) and an oscillator.

The radar receiver may receive a reception signal, which is reflected back by the object, through the reception antenna.

The radar receiver may switch to, or select, one of the plurality of reception antennas and receive the reception signal, which is reflected back by the target, through the switched or selected reception antenna, or receive the reception signal through multiple reception channels allocated to the plurality of reception antennas.

The radar receiver may include, for example, but not limited to, a low noise amplifier (LNA) configured to low-noise amplifies the reception signal, which is received through one reception channel allocated to the switched or selected reception antenna or through multiple reception channels allocated to the plurality of reception antennas; a mixer configured to mix the low-noise amplified reception signal; an amplifier configured to amplify the mixed reception signal; and an analog-digital converter (ADC) configured to convert the amplified reception signal into a digital signal to generate reception data.

In another example, the transceiver 110 may control the above-described radar sensor to output a control signal to be transmitted to the radar sensor, and receive a reception signal from the radar sensor.

The track generator 120 may generate a track for an object based on the reception signal. For example, the track generator 120 may calculate a measurement by performing fast Fourier transform (FFT) on the reception signal. Specifically, the track generator 120 may convert the reception signal into the distance (range)-time index by performing primary FFT on the frequency, and convert the distance (range)-time index into the range-velocity (Doppler) index by performing secondary FFT on the time.

The track generator 120 may generate a track 410 for the detected object based on the calculated measurement.

In an example, the track generator 120 may calculate a track center position from the calculated measurements, and generate the track 410 as a rectangle or square with the center of gravity as the track center position.

The above-described shape of the track 410 is merely an example and the track 410 is not limited to any specific shape.

For instance, the track 410 may have a shape of circular, oval, polygonal, diamond, or any appropriate shapes.

For convenience of description, the track 410 having the shape of a rectangle is described hereafter.

The vehicle position calculator 130 may calculate the position of the host vehicle 20 at every preset period.

The position of the host vehicle 20 may be calculated in the form of a position point. For example, the position of the host vehicle 20 may be calculated in the form of one or more points, which may be calculated as coordinates on the coordinate system.

Figure 2:
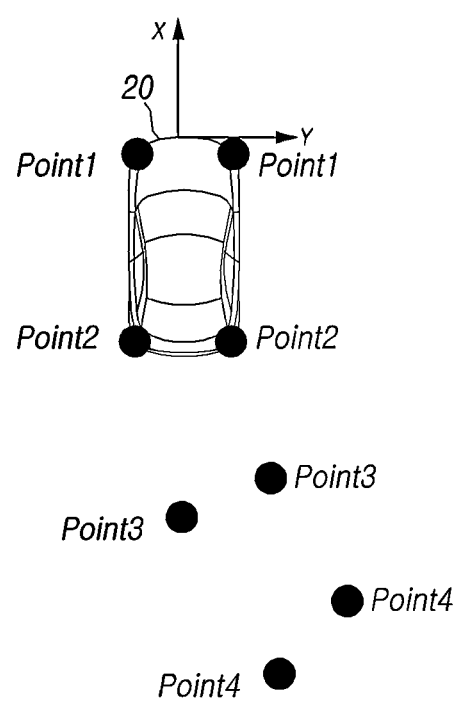
FIG. 2 is a view for illustrating an operation for compensating for the position of a host vehicle according to an embodiment of the present disclosure.

FIG. 2 is a view illustrating an operation for compensating for a position of the host vehicle 20 according to an embodiment of the present disclosure.

Referring to FIG. 2, arrays Left side and Right side having n points under the assumption that two opposite end points of the vehicle are inputted using information about the width of the host vehicle 20 may be set as in Equation 1 below.

$$\begin{bmatrix} x_1 \dots n \\ y_1 \dots n \end{bmatrix}(\text{Left side}), \begin{bmatrix} x_1 \dots n \\ y_1 \dots n \end{bmatrix}(\text{Right side}) \quad [\text{Equation 1}]$$

Here, $x_n$ and $y_n$ are coordinate points of Point n.

The vehicle position calculator 130 may set the initial position of the host vehicle 20 as in Equation 2 below.

$$\begin{bmatrix} x_1 \\ y_1 \end{bmatrix}(\text{Left side}) = \begin{bmatrix} 0 \\ -\text{width}/2 \end{bmatrix}, \begin{bmatrix} x_1 \\ y_1 \end{bmatrix}(\text{Right side})\begin{bmatrix} 0 \\ \text{width}/2 \end{bmatrix} \quad [\text{Equation 2}]$$

Here, width represents the width of the host vehicle 20. x1 and y1 represent the coordinate point of Point 1 of FIG. 2. In other words, two points calculated by the vehicle position calculator 130 may correspond to two opposite ends of the host vehicle 20. This is merely an example for illustration purposes only, and the initial position of the host vehicle 20 may be set as any appropriate value. The initial position may be set by a position detected by, for example, but not limited to, a sensor.

The vehicle position calculator 130 may calculate the position of the host vehicle 20 at every predetermined period, and positions of the host vehicle 20 calculated in the past with respect to the position of the host vehicle 20 calculated in the current period may be compensated through Equation 3 below.

$$\begin{bmatrix} x_{n+1} \\ y_{n+1} \end{bmatrix} = \begin{bmatrix} \cos(\Delta\varphi) & \sin(\Delta\varphi) \\ -\sin(\Delta\varphi) & \cos(\Delta\varphi) \end{bmatrix} * \begin{bmatrix} x_n \\ y_n \end{bmatrix} - \begin{bmatrix} v_{x,h} \\ v_{y,h} \end{bmatrix} \quad [\text{Equation 3}]$$

Here, $x_n$ and $y_n$ are the position of the host vehicle 20 calculated at the current period, and $x_{n+1}$ and $y_{n+1}$ are the position of the host vehicle 20 calculated at the previous period and are the longitudinal position and the lateral position of the host vehicle 20, respectively, on the coordinate system. $\Delta\varphi$ represents displacement (e.g., yaw rate) of the heading angle of the host vehicle 20 during a predetermined period, $v_{x,h}$ is the longitudinal velocity of the host vehicle 20 (i.e., ego vehicle), and $v_{y,h}$ is mean the lateral velocity of the host vehicle 20 (i.e., ego vehicle).

Therefore, if each position of the host vehicle 20 calculated at a respective predetermined period is applied to Equations 2 and 3 above, Points 1 to 4 of FIG. 2 may be obtained.

In other words, the vehicle position calculator 130 may compensate for the position of the host vehicle 20 at the previous period, based on the displacement (for example, a yaw rate) of the host vehicle 20 during a predetermined period and the current vehicle velocity.

To that end, the vehicle position calculator 130 may receive information about a yaw rate from a yaw rate sensor, receive information about a steering angle of a steering wheel from a steering angle sensor, and receive information about a vehicle velocity from a vehicle velocity sensor.

Figure 3:
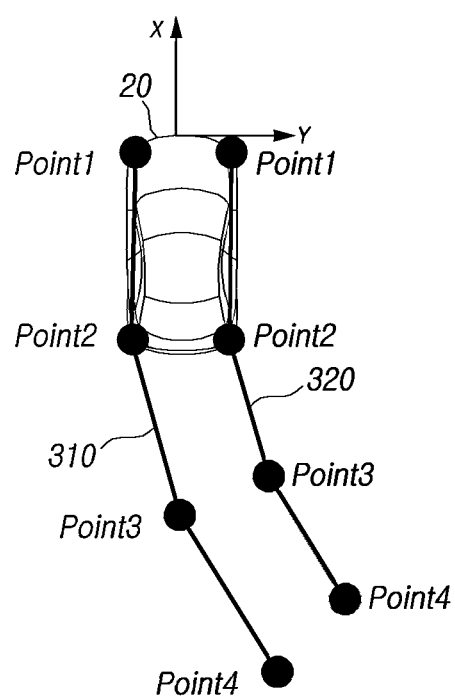
FIG. 3 is a view for illustrating an operation for producing a vehicle path of a host vehicle according to an embodiment of the present disclosure.

FIG. 3 is a view for illustrating an operation for producing a vehicle path of the host vehicle 20 according to an embodiment of the present disclosure.

Referring to FIG. 3, the radar control device 10 according to an embodiment of the present disclosure may further include a vehicle path producer configured to connect the positions of the host vehicle 20 calculated at every predetermined period to produce a vehicle path of the host vehicle 20.

When the host vehicle 20 has two positions, the vehicle path producer may identify the positions of the left side and the right side of the host vehicle 20, produce a first vehicle path 310 only with the positions of the host vehicle 20 calculated with respect to the left side of the host vehicle 20, and produce a second vehicle path 320 only with the positions of the host vehicle calculated on the right side of the host vehicle 20.

In other words, using Equations 2 and 3 described above, the vehicle path producer may connect the left points calculated with respect to the left side of the host vehicle 20 to produce the first vehicle path 310 and connect the right points calculated with respect to the right side of the host vehicle 20 to produce the second vehicle path 320.

Accordingly, for the host vehicle 20, two positions including a first position and a second position spaced apart from the first position by a predetermined interval can be calculated. The vehicle path producer may identify the first position and the second position of the host vehicle 20, produce the first vehicle path 310 based on the first positions calculated at every preset period, and calculate the second vehicle path 320 spaced apart from the first vehicle path 310 by a predetermined interval.

Thus, the radar control device 10 according to an embodiment of the disclosure may enhance the accuracy of estimating the orientation angle of the track 410 for the detected object by generating the vehicle path.

The orientation angle estimator 140 may estimate the orientation angle of the track 410 for the detected object based on the track 410 for the detected object and the position of the host vehicle 20.

Figure 4:
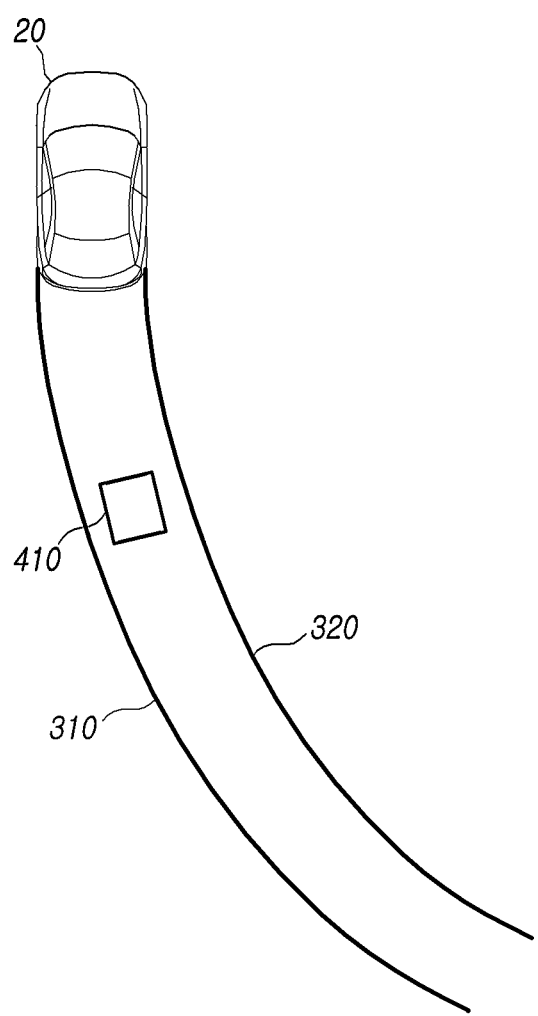
FIG. 4 is a view for illustrating an operation for estimating an orientation angle of a track for an object according to an embodiment of the present disclosure.

FIG. 4 is a view for illustrating an operation for estimating an orientation angle of the track 410 for the detected object according to an embodiment of the present disclosure.

Referring to FIG. 4, the orientation angle estimator 140 may estimate the orientation angle of the track 410 for the detected object only when the track 410 for the detected object is generated between the first vehicle path 310 and the second vehicle path 320.

In an example, the orientation angle estimator 140 may estimate the orientation angle of the track 410 for the detected object only when the track center position of the track 410 for the detected object is determined to be present between the first vehicle path 310 and the second vehicle path 320. In other words, although the edge of the track 410 for the detected object is out of the range between the first vehicle path 310 and the second vehicle path 320, if the track center position of the detected object is determined to be positioned between the first vehicle path 310 and the second vehicle path 320, the orientation angle of the track 410 for the detected object may be estimated.

Thus, the radar control device 10 according to an embodiment of the present disclosure may increase the reliability for the produced orientation angle considering when the object detected by the radar does not follow the host vehicle 20 due to a lane change.

Figure 5:
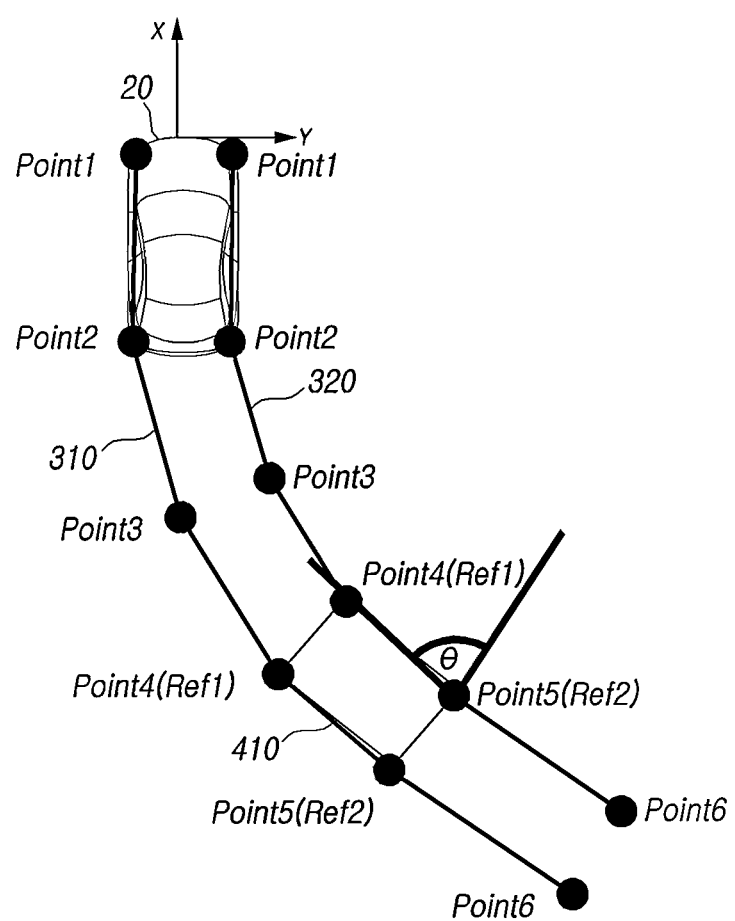
FIG. 5 is a view for illustrating an operation for estimating an orientation angle of another track for an object according to an embodiment of the present disclosure.

FIG. 5 is a view for illustrating an operation for estimating an orientation angle for the track 410 for the detected object according to an embodiment of the present disclosure.

The orientation angle estimator 140 may set a position of the host vehicle 20 closest to the generated track 410 for the detected object among the plurality of calculated positions of the host vehicle 20 as a first reference point, and set a position of the host vehicle 20 closest to the first reference point among the plurality of calculated positions of the host vehicle 20 as a second reference point. Then, the orientation angle estimator 140 can estimate the orientation angle of the track 410 for the detect object based on the first reference point and the second reference point.

The orientation angle estimator 140 may estimate the orientation angle of the track 410 for the detected object by calculating an angle between the traveling direction of the host vehicle 20 and the straight line connecting the first reference point and the second reference point.

In an example, the orientation angle estimator 140 may estimate the orientation angle of the track 410 for the detected object using Equation 4 below.

$$\theta = \frac{y_{ref1} - y_{ref2}}{x_{ref1} - x_{ref2}} \qquad \text{[Equation 4]}$$

In other words, the orientation angle θ may be calculated by dividing the difference between the y component $y_{ref1}$ of the first reference point and the y component $y_{ref2}$ of the second reference point by the difference between the x component $x_{ref1}$ of the first reference point and the x component $x_{ref2}$ of the second reference point.

Here, the coordinate axis x may be the same as the traveling direction of the host vehicle 20.

Referring to FIG. 5, the orientation angle estimator 140 may produce Point 4, which is the position of the host vehicle closest to the track 410 for the detected object in FIG. 5, on each of the right side and the left side to set the first reference point and set Point 5, determined to be the position closest to Point 4 set as the first reference point, as the second reference point.

For example, when the track for the detected object is positioned within a rectangle formed by Points 4 and Points 5, and is positioned closest to Point 4, one point closest to the center point of the track for the detected object along the straight line may be selected. Another point corresponding to the selected point or a point obtained at the same time as the selected point may be selected together. In other words, only one point Point 4 on the left side or a pair of points Points 4 on both the left side and the right side may be selected. Thereafter, Point 5, which is positioned closest to the selected Point 4, is selected. Or, another Point 5, which is obtained at the same time as the selected Point 5, may be also selected.

In an example, the orientation angle estimator 140 may set the position of the host vehicle 20 closest to the track center position as the first reference point.

In another example, if there are a plurality of vehicle paths, the orientation angle estimator 140 may set a reference point with respect to one vehicle path.

If there are a plurality of vehicle paths in the track 410, the position of the host vehicle 20 in the same period may not always be determined to be the position closest to the track 410 for the detected object according to the position where it is generated. Accordingly, the orientation angle value estimated in the first vehicle path 310 and the orientation angle value estimated in the second vehicle path 320 may be the same or different. If the orientation angle value estimated in the first vehicle path 310 and the orientation angle value estimated in the second vehicle path 320 are different, the orientation angle estimator 140 may estimate the average of the two estimated orientation angles as the orientation angle.

Figure 6:
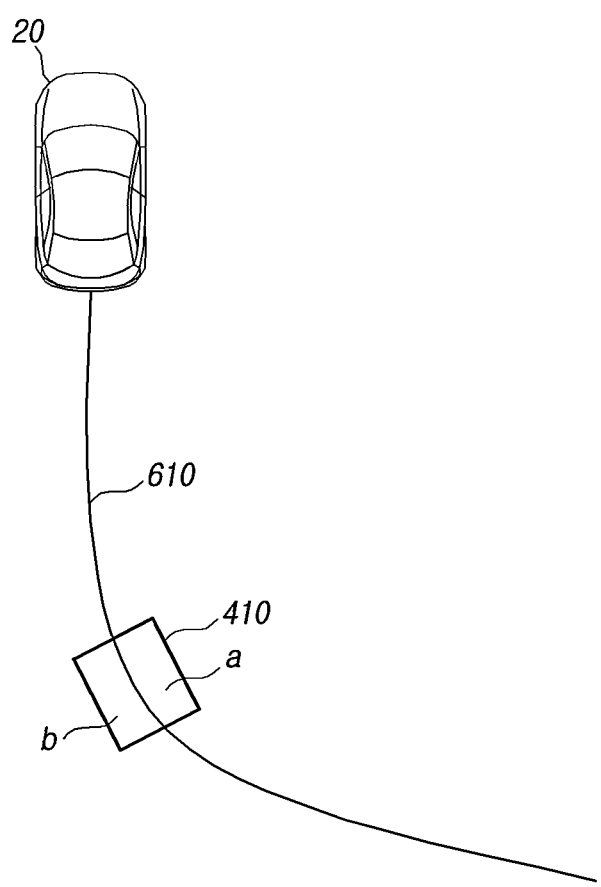
FIG. 6 is a view for illustrating an operation for estimating an orientation angle of a track for an object when a vehicle path divides the track according to an embodiment of the present disclosure.

FIG. 6 is a view for illustrating for estimating an orientation angle of the track 410 for the detected object when a third vehicle path 610 divides the track 410 for the detected object according to an embodiment of the present disclosure.

The position of the host vehicle 20 may include a third position which is the center of the host vehicle 20, and the vehicle path producer may connect the plurality of third positions to produce the third vehicle path 610.

Referring to FIG. 6, if the track 410 for the detected object is located on or overlapped with the third vehicle path 610, the orientation angle estimator 140 may estimate the orientation angle for the track 410 for the detected object only when the ratio of a larger section of the track 410 for the detected object divided by the third vehicle path 610 to the entire area of the track 410 is equal to or less than a predetermined ratio.

For example, if the track 410 for the detected object is divided into sections a and b by the third vehicle path 610 as illustrated in FIG. 6, the orientation angle estimator 140 may compare areas of sections a and b of the track 410 for the detected object with each other. If the section a of the track 410 is larger in area than the section b of the track 410, the orientation angle estimator 140 may compare the area of the section a of the track 410 with the entire area of the track 410, and only when the ratio of the area of the section a to the entire area of the track 410 is equal to or less than a predetermined ratio, the orientation angle estimator 140 may estimate the orientation angle of the track 410 for the detected object.

Since the third vehicle path 610 is produced with respect to the center of the host vehicle 20, if an ideal track 410 for the detected object is generated in the context where another vehicle follows the host vehicle 20, the third vehicle path 610 may divide the generated track 410 for the detected object into about 5:5 area ratio.

Here, if the following vehicle deviates from the traveling road due to, for instance, a lane change, the accuracy of the orientation angle estimated for the track 410 for the detected object may be reduced. Accordingly, the orientation angle of the tract 410 for the detected object should be estimated only on the track 410 generated by the other vehicle following the host vehicle 20. Therefore, the radar control device 10 according to an embodiment of the disclosure may identify the other vehicle deviating from the road through the ratio of areas sections of the track 410, thereby enhancing the accuracy of the orientation angle of the track 410 for the detected object.

As described above, the radar device 10 according to an embodiment of the disclosure may more precisely estimate the orientation angle of the track 410 for the detected object, thereby extracting the range rate of the detected object as the velocity component and hence enabling the tracking of the object which is detected from far away, even with relatively small measurements.

The radar control device 10 may be implemented as, for example, but not limited to, an electronic control unit (ECU).

According to an embodiment of the present disclosure, a computer system comprising the radar control device 10 may be implemented as the ECU. The ECU may include at least one or more of one or more processors, a memory, a storage unit, a user interface input unit, or a user interface output unit which may communicate with one another via a bus. The computer system may also include a network interface for accessing a network. The processor may be a central processing unit (CPU) or semiconductor device that is capable of executing processing instructions stored in the memory and/or the storage unit. The memory and the storage unit may include various types of volatile and/or non-volatile storage media. For example, the memory may include a read only memory (ROM) and a random access memory (RAM).

Described below is a radar control method using the radar control device 10 capable of performing the above-described embodiments of the present disclosure.

Figure 7:
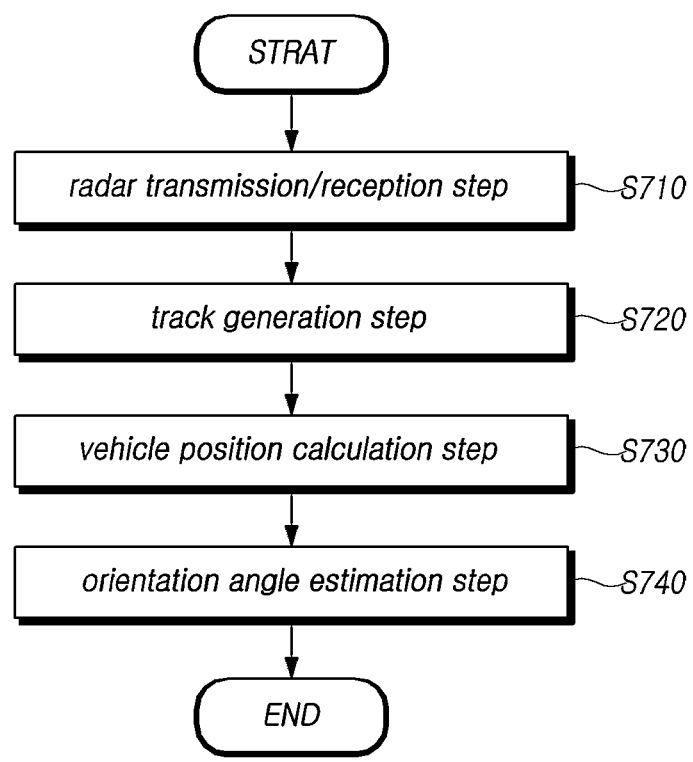
FIG. 7 is a flowchart for illustrating a radar control method according to an embodiment of the present disclosure.

FIG. 7 is a flowchart for illustrating a radar control method according to an embodiment of the present disclosure.

Referring to FIG. 7, the radar control method according to the present disclosure may include a radar transmission/reception step S710 for transmitting a transmission signal for detecting surroundings of a host vehicle and receiving a reception signal reflected back to a radar, a track generation step S720 for generating the track 410 for an object detected based on the reception signal, a vehicle position calculation step S730 for calculating a position of the host vehicle 20 at every preset period, and an orientation angle estimation step S740 for estimating an orientation angle of the track 410 for the detected object based on the track 410 for the detected object and the position of the host vehicle 20.

The radar control method may further include a vehicle path producing step for producing a vehicle path of the host vehicle by connecting positions of the host vehicle calculated at every predetermined period. The positions of the host vehicle 20 may include a first position of the host vehicle 20 and a second position spaced apart from the first position by a predetermined interval. The vehicle path may include a first vehicle path 310 produced based on the first positions and a second vehicle path 320 spaced apart from the first vehicle path 310 by a predetermined interval. The position of the host vehicle 20 may include a third position which is a center of the host vehicle 20. The vehicle path may include a third vehicle path 610 produced by connecting the third positions.

The orientation angle estimation step S740 may estimate the orientation angle of the track 410 for the detected object only when the track 410 for the detected object is generated between the first vehicle path 310 and the second vehicle path 320.

The orientation angle estimation step S740 may estimate the orientation angle the track 410 for the detected object only when a ratio of an area of a larger section of the track 410 divided by the third vehicle path 610 to the entire area of the track 410 is equal to or less than a predetermined ratio.

The track generation step S720 may calculate a track center position based on a measurement calculated from the reception signal, and generate the track 410 for the detected object as a rectangle or square having the track center position as a center of gravity. The track generation step S720 may set a group of measurements and set the center point of the group as the track center position.

The host vehicle calculation step S730 may compensate for the position of the host vehicle 20 in the previous period, based on the displacement (e.g. yaw rate) of the host vehicle 20 during a predetermined period and the current vehicle velocity.

To that end, the radar control device 10 may receive yaw rate information or vehicle velocity information from sensors mounted to the host vehicle 20 or receive related information from a steering control device for controlling the steering of the vehicle.

The orientation angle estimation step S740 may set a position of the host vehicle 20 closest to the track 410 for the detected object among the plurality of calculated positions of the host vehicle 20 as a first reference point, and set a position of the host vehicle 20 closest to the first reference point as a second reference point. The orientation angle estimation step S740 may estimate the orientation angle for the track 410 for the detected object based on the first reference point and the second reference point.

The orientation angle estimation step 740 may estimate the orientation angle for the track 410 for the detected object by calculating an angle between the traveling direction of the host vehicle 20 and the straight line connecting the first reference point and the second reference point.

Figure 8:
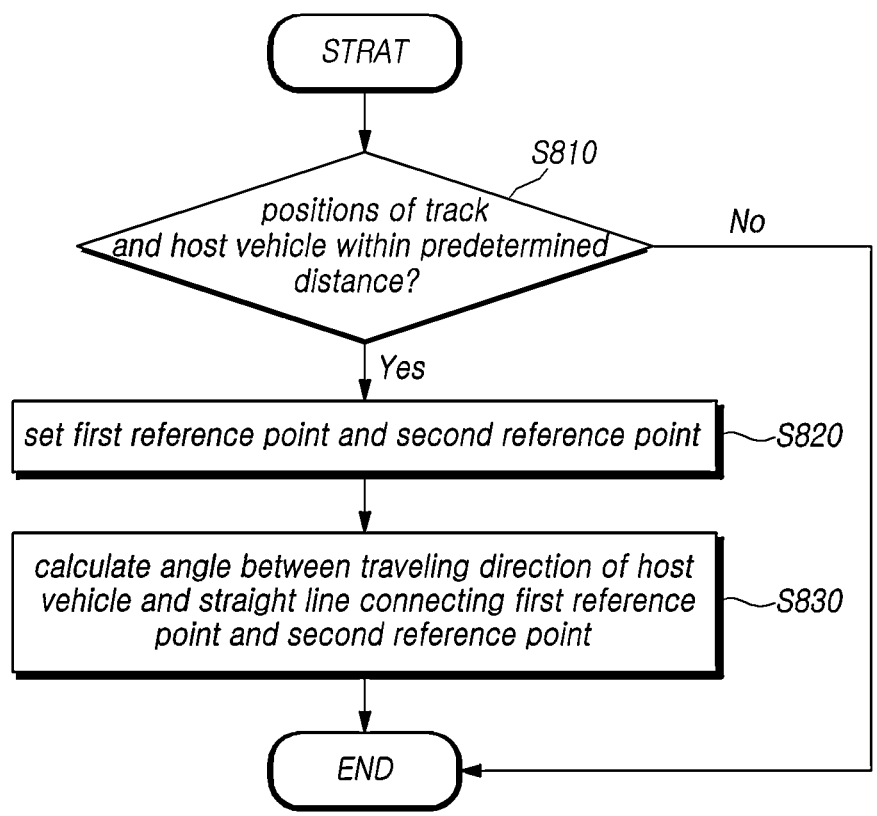
FIG. 8 is a flowchart for illustrating a step for orientation angle estimation according to an embodiment of the present disclosure.

FIG. 8 is a flowchart for illustrating a step for orientation angle estimation according to an embodiment of the present disclosure.

Referring to FIG. 8, the radar control device 10 may determine whether the positions of the track 410 for the detected object and the host vehicle 20 are within a predetermined distance (step S810). Here, if a plurality of vehicle paths are produced, the radar control device 10 may determine all of the positions of the host vehicle 20 included in the plurality of vehicle paths, compare distances from the track 410 for the detected object, and determine the distance from the tract 410 for the detected object to the position of the host vehicle 20 included in a specific vehicle path.

When the positions of the track 410 and the host vehicle are within the predetermined distance (i.e. yes in step S810), the radar control device 10 may set a first reference point and a second reference point (step S820).

In an embodiment of the present disclosure, when setting the first reference point, the radar control device 10 may set the position of the host vehicle 20 closest to the track center position as the first reference point.

The radar control device 10 may calculate the angle between the traveling direction of the host vehicle 20 and the straight line connecting the first reference point and the second reference point (S830). The calculated angle may be used as the estimated orientation angle of the track 410 for the detected object.

In an example, the radar control device 10 may calculate a value θ by applying the x component and y component of the first reference point and second reference point to Equation 4 above and estimate the calculated value θ as the orientation angle for the track 410.

Figure 9:
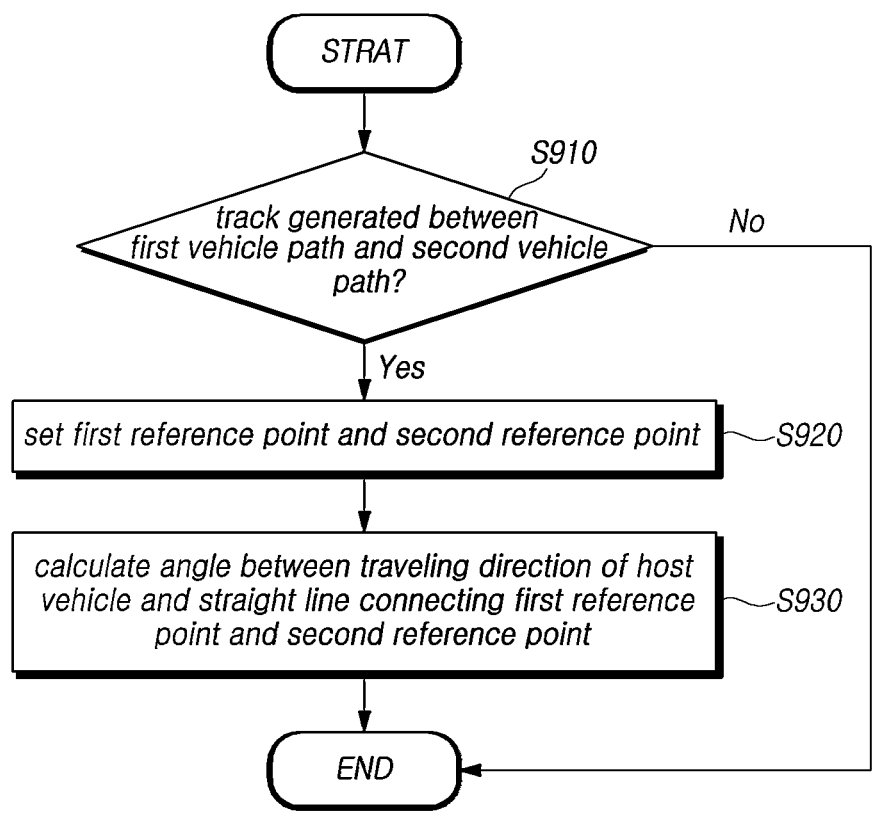
FIG. 9 is a flowchart for illustrating a step for orientation angle estimation according to another embodiment of the present disclosure.

FIG. 9 is a flowchart for illustrating a step for orientation angle estimation according to an embodiment of the present disclosure.

Referring to FIG. 9, the radar control device 10 may determine whether the track 410 for the detected object is generated between the first vehicle path 310 and the second vehicle path 320 (step S910). In an example, the radar control device 10 may determine whether the track center position, which is the center of gravity of the track 410 for the detected object, is calculated between the first vehicle path 310 and the second vehicle path 320.

Upon determining that the track 410 for the detected object is generated between the first vehicle path 310 and the second vehicle path 320 (i.e., yes in step S910), the radar control device 10 may set the first reference point and the second reference point (step S920).

The radar control device 10 may set the position of the host vehicle 20 closest to the track center position as the first reference point.

The radar control device 10 may calculate an angle between the traveling direction of the host vehicle 20 and the straight line connecting the first reference point and the second reference point (step S930). The calculated angle may be used as the estimated orientation angle of the track 410 for the detected object. In an example, if the orientation angle estimated based on the first vehicle path 310 differs from the orientation angle estimated based on the second vehicle path 320, and the difference between the estimated orientation angles is equal to or greater than a predetermined angle, the average of the estimated orientation angles may be calculated to be used as a final orientation angle.

As described above, according to an embodiment of the disclosure, the radar control device and method may more precisely estimate the orientation angle of the track for an object, thereby extracting the range rate of the detected object as the velocity component and hence enabling the tracking of the object which is detected from far away, even with relatively small measurements.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A radar control device, comprising:
   a transceiver configured to transmit a transmission signal for detecting surroundings of a host vehicle and receive a reception signal reflected back to the transceiver; and
   a processor configured to:
   generate a track for an object detected based on the reception signal,
   calculate a plurality of positions of the host vehicle at one or more preset periods, and
   estimate an orientation angle of the track for the detected object based on the track for the detected object and the plurality of positions of the host vehicle,
   wherein the processor is configured to:
   set a position of the host vehicle closest to the track for the detected object among the plurality of positions of the host vehicle as a first reference point,
   set a position of the host vehicle closest to the first reference point among the plurality of positions of the host vehicle as a second reference point, and
   estimate the orientation angle for the track for the detected object based on the first reference point and the second reference point.

2. The radar control device of claim 1, wherein the processor is configured to estimate the orientation angle of the track for the detected object by calculating an angle between a traveling direction of the host vehicle and a line connecting the first reference point and the second reference point.

3. The radar control device of claim 1, wherein the processor is configured to generate a vehicle path of the host vehicle by connecting the plurality of positions of the host vehicle calculated at the predetermined periods.

4. The radar control device of claim 3, wherein:
   each of the plurality of positions of the host vehicle includes a first position of the host vehicle and a second position spaced apart from the first position by a predetermined interval, and
   the vehicle path of the host vehicle includes a first vehicle path generated based on the first position and a second vehicle path spaced apart from the first vehicle path by a predetermined interval.

5. The radar control device of claim 4, wherein the processor is configured to estimate the orientation angle of the track for the detected object when the track for the detected object is between the first vehicle path and the second vehicle path.

6. The radar control device of claim 3, wherein:
   each of the plurality of positions of the host vehicle includes a third position which is a center of the host vehicle, and
   the vehicle path of the host vehicle includes a third vehicle path generated by connecting the third position.

7. The radar control device of claim 6, wherein the processor is configured to, when the track for the detected object is positioned on the third vehicle path, estimate the orientation angle of the track for the detected object when a ratio of an area of a larger section of the track divided by the third vehicle path to an area of an entire area of the track is equal to or less than a predetermined ratio.

8. The radar control device of claim 3, wherein, if there are a plurality of vehicle paths in the track, the processor estimates an average of a plurality of estimated orientation angles according to the plurality of vehicle paths as the orientation angle.

9. The radar control device of claim 1, wherein the processor is configured to compensate for a position of the host vehicle at a previous period based on a current vehicle velocity and a yaw rate displacement of the host vehicle at a current period.

10. The radar control device of claim 1, wherein the processor is configured to calculate a center position of the track for the detected object based on measurement calculated from the reception signal, and generate the track for the detected object with a rectangle or square in which the center position of the track for the detected object is positioned.

11. A radar control method, comprising:
    transmitting a transmission signal for detecting surroundings of a host vehicle and receiving a reception signal reflected back to the transceiver;
    generating a track for an object detected based on the reception signal;
    calculating a plurality of positions of the host vehicle at one or more preset periods; and
    estimating an orientation angle of the track for the detected object based on the track for the detected object and the plurality of positions of the host vehicle,
    wherein the estimating of the orientation angle of the track for the detected object comprises:
    setting a position of the host vehicle closest to the track for the detected object among the plurality positions of the host vehicle as a first reference point, setting a position of the host vehicle closest to the first reference point among the plurality of positions of the host vehicle as a second reference point, and estimating the orientation angle of the track for the detected object based on the first reference point and the second reference point.

12. The radar control method of claim 11, wherein the estimating of the orientation angle of the track for the detected object comprises estimating the orientation angle of the track for the detected object by calculating an angle between a traveling direction of the host vehicle and a line connecting the first reference point and the second reference point.

13. The radar control method of claim 11, further comprising generating a vehicle path of the host vehicle by connecting the plurality of positions of the host vehicle calculated at the predetermined periods.

14. The radar control method of claim 13, wherein:

each of the plurality of positions of the host vehicle includes a first position of the host vehicle and a second position spaced apart from the first position of the host vehicle by a predetermined interval, and the vehicle path includes a first vehicle path produced based on the first position and a second vehicle path spaced apart from the first vehicle path by a predetermined interval.

15. The radar control method of claim 14, wherein the estimating of the orientation angle of the track for the detected object comprises estimating the orientation angle of the track for the detected object when the track for the detected object is between the first vehicle path and the second vehicle path.

16. The radar control method of claim 13, wherein:

each of the plurality of positions of the host vehicle includes a third position which is a center of the host vehicle, and the vehicle path includes a third vehicle path generated by connecting the third position.

17. The radar control method of claim 16, wherein when the track for the detected object is positioned on the third vehicle path, the orientation angle of the track for the detected object when a ratio of an area of a larger section of the track divided by the third vehicle path to an entire area of the track is equal to or less than a predetermined ratio.

18. The radar control method of claim 13, wherein the generating of the vehicle path of the host vehicle comprises compensating for a position of the host vehicle at a previous period based on a current vehicle velocity and a yaw rate displacement of the host vehicle at a current period.

19. The radar control method of claim 13, wherein, if there are a plurality of vehicle paths in the track, the orientation angle is determined as an average of a plurality of estimated orientation angles according to the plurality of vehicle paths.

20. The radar control method of claim 11, wherein the generating of the track for the object detected based on the reception signal comprises calculating a center position of the track for the detected object based on measurement calculated from the reception signal, and generating the track for the detected object with a rectangle or square in which the center position of the track for the detected object is positioned.

* * * * *